Oct. 23, 1951  G. D. ALVAREZ  2,572,298
PLOW WITH ROTARY STALK CUTTER
Filed Aug. 16, 1948  2 SHEETS—SHEET 1
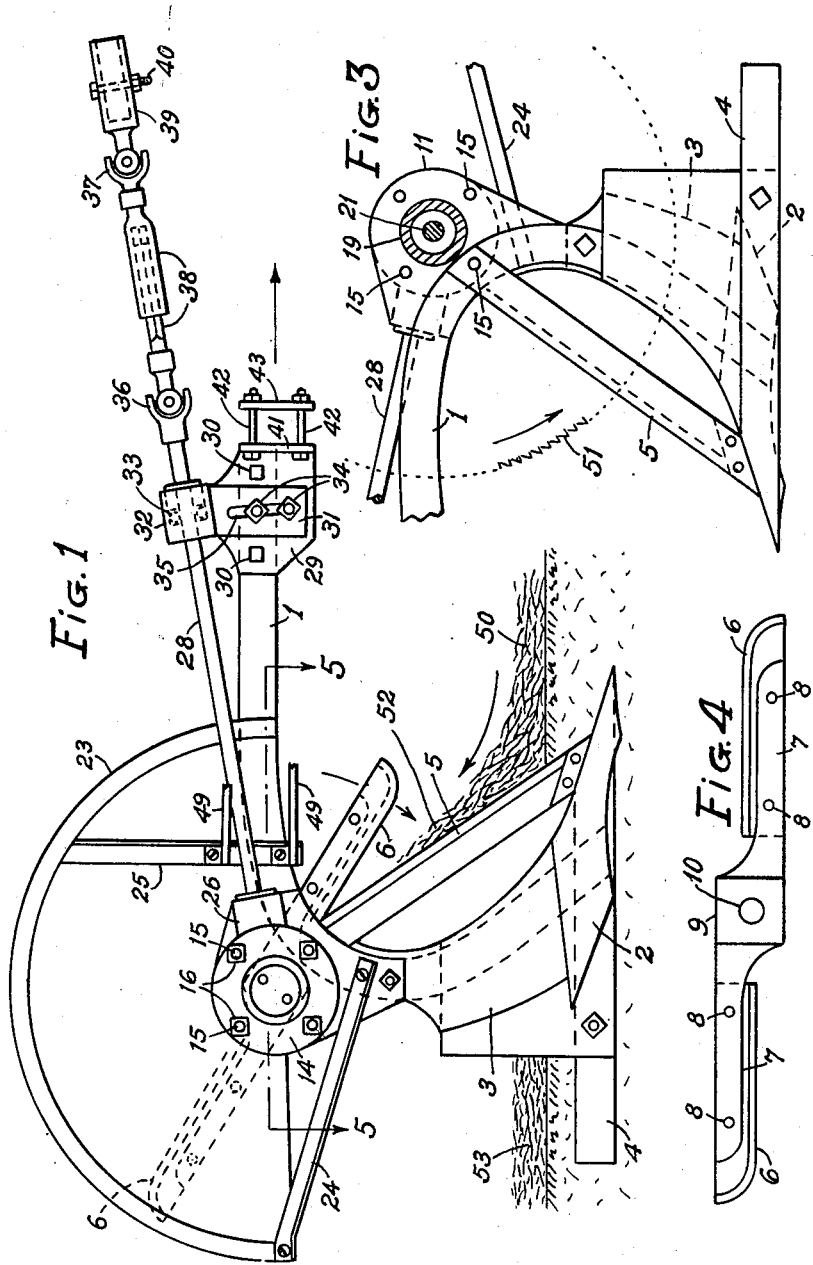
INVENTOR.
Guillermo Diaz Alvarez
BY
E. F. Wenderoth
ATTORNEY.

Oct. 23, 1951 — G. D. ALVAREZ — 2,572,298
PLOW WITH ROTARY STALK CUTTER
Filed Aug. 16, 1948 — 2 SHEETS—SHEET 2
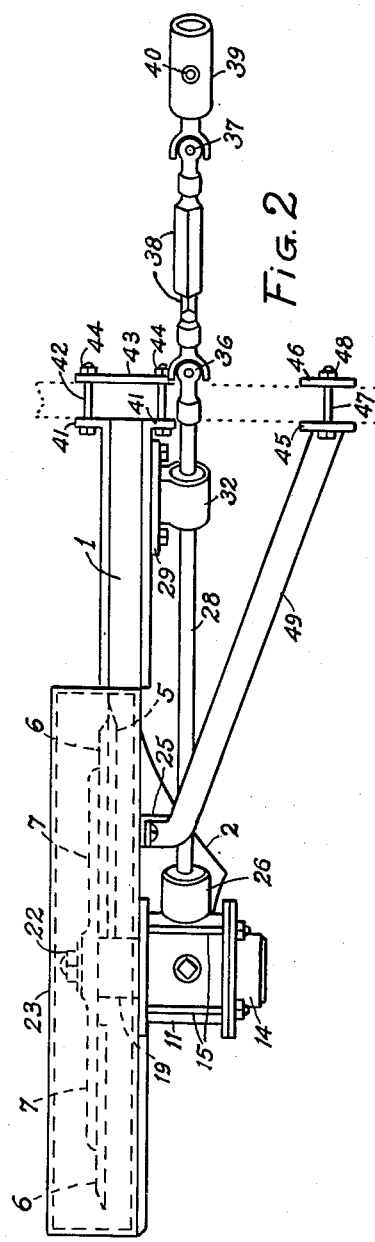
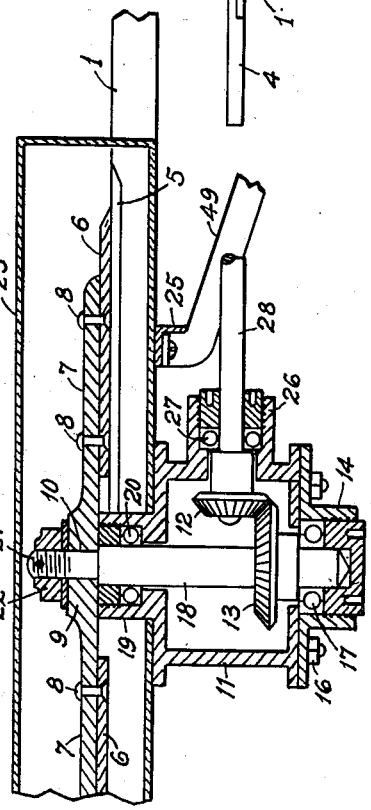
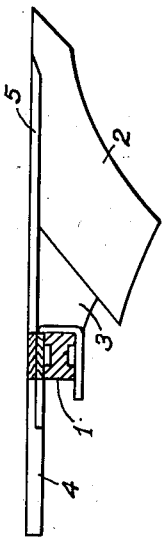
INVENTOR.
Guillermo Diaz Alvarez
BY
E. F. Wenderoth
ATTORNEY.

Patented Oct. 23, 1951

2,572,298

UNITED STATES PATENT OFFICE 2,572,298

PLOW WITH ROTARY STALK CUTTER

Guillermo Diaz Alvarez, Habana, Cuba

Application August 16, 1948, Serial No. 44,573
In Cuba July 23, 1948

3 Claims. (Cl. 97—35)

The invention is related to improvements in cultivator plows of the type known in the art for the cultivation of the land and more specifically for breaking up plow ridges close to the cane plants and stems and loosening up the earth in cane fields harvested in previous years and covered with the cane trash which forming a thick and matted litter makes plowing or cultivating operations extremely difficult.

Due to the fact that every cane field after the first cutting or harvesting of the cane presents a great accumulation of dried cane leaves which greatly hinders the work of the plow when cultivating said fields and loosening the earth close to the cane stalks unless said litter of cane leaves is first removed, generally by hand, I have provided means which while the plow is being drawn along cuts said cane leaves as they rise on the share towards the plow throat.

One of the most important advantages of the improvements in cultivator plows invented by me consists in the fact that the litter of cane leaves covering the ground on being raised by the action of a fixed blade as the plow moves forward, is rapidly cut by the movable cutters working in cooperation with said fixed blade and falls back to the ground where it occupies its original position, without being rolled along or accumulating at different points; remaining as before the ground was plowed, forming a thick, uniform covering that retains the moisture in the ground and prevents the growth of grass and weeds thus producing great economy in the cultivation of the cane.

Since the plow does not possess a mould board it does not form furrows so that the share simply breaks up the earth beneath the litter of cane leaves, without exposing the soil to sunlight or air and allowing it to retain its moisture, as already stated.

Another advantage is due to the lightness and rapidity with which the plow can be worked in breaking up the ground, on account of the mechanical working of the cutters driven at a high velocity by the motor of the tractor that draws the plow or, if preferred, by an independent motor attached to the plow, it being preferable to employ the motor of the tractor because this arrangement simplifies the equipment and both the connections and the driving are easier to perform.

Up to the present several experiments and trials have been made in an effort to obtain the results attained by me, that is the elimination of the obstacles represented by the litter of cane leaves and particularly in those fields where the cane has been harvested for more than three seasons, in some of them recourse has been had to the burning of said cane litter but, logically this burning of the litter has left the ground completely exposed and dry, besides allowing grass and weeds to invade the field. In said experiments the cultivator plows have been furnished with straw cutting discs attached to the forward end of the plow, that is, close to the spur of the share, but due to the ineffective and useless work of the same they have been abandoned.

In the improvement invented by me I provide a cutting device comprising a stationary cutting blade attached to the plow beam and to the plow share, and rotary cutters consisting of two or more arms or, if preferred, a circular saw, said cutting elements actuating on the stationary cutting blade previously mentioned. Said arms or circular saw being moved by the action of the motor that draws the plow or, if preferred by a motor mounted on the plow itself, but, as stated before, it is preferable to employ the power supplied by the tractor.

Instead of the cutters mentioned there may be employed cutters that function as scissors or a reciprocating cutter of the guillotine type, in cooperation with the fixed blade, the power for the same being supplied by either of the two methods previously mentioned. These and other features of my invention will be presently described in detail with reference to the two sheets of drawings annexed to this specification and in which similar reference characters identify the same parts in the views in which said parts appear. In the drawings:

Figure 1 is a lateral elevation of the plow or cultivator with the device attached, as seen from the side of the share.

Figure 2 is a top view of the same.

Figure 3 is a partial side view of the plow of Figure 1, as seen from the side opposite to that of the share.

Figure 4 is a frontal view of the arms bearing the rotary cutters.

Figure 5 is a horizontal section through line 5—5 of Figure 1 and shows the transmission mechanism attached to the bearers of the rotary cutters.

Figure 6 is a horizontal section showing the manner in which the stationary blade is attached to the plow share.

Referring to the drawing we have that 1 indicates the plow beam, 2 is the plow share or spur, 3 is the extension of the share and 4 the plow slade. The blade 5 is attached at a convenient angle to the end of the share and to the plow beam at the plow throat; 6 indicates the rotary cutters and the supporting arms for the same are indicated by 7, while 8 identifies the countersunk rivets that serve to attach cutters 6 to arms 7 and 9 indicates the hub from which project arms 7, said hub being provided at its central portion with perforation 10. In the upper part of the plow beam 1, in the portion of it that forms the throat of the plow is mounted casing 11 that serves to enclose pinion 12 and 13 and also the grease employed in their lubrication, the front of said casing being closed by cover or cap 14 attached to it by bolts 15 and nuts 16, within said casing 11 is mounted ball bearing 17 attached to one end of shaft 18 to which is attached pinion 13. Shaft 18 is prolonged through bushing 19 in which is lodged ball bearing 20 supporting shaft 18 which in its outer end terminates in a portion of reduced diameter 21, said reduced portion penetrating snugly in perforation 10 of hub 9 from which project radially arms 7 to which are attached cutter blades 6, said hub 9 being firmly attached to reduced portion 21 of axle 18 by nut 22 screwed to the threaded end of said portion 21 and by a keyway and cotter key.

This rotary cutter mechanism is protected by cover 23 secured to plow beam 1 by screws and supporting and reinforcing members 24 and 25.

From casing 11 there extends outwardly a journal box 26 in which is lodged ball bearing 27 in which is journaled shaft 28 to the inner end of which is attached pinion 12, which meshing with pinion 13 transmits motion to shaft 18.

At the end of plow beam 1 we have, first bead plate 29 firmly attached to beam 1 by screws 30, to the outer face of said plate 29 is adjustably connected bearing plate 31 to the upper end of which is attached bearing box 32 provided with ball bearing 33, said bearing plate 31 being vertically adjustable by means of bolts and nuts 34 that play in slot 35 to allow the position of shaft 28 to be changed at will, raising or lowering it as the case may be, to allow for coupling adjustments, immediately adjacent to bearing box 32 is located a section of shaft articulated by Cardan joints 36 and 37 with an intermediate telescopic section 38, said connecting articulated shaft ending in a cup shaped coupling portion 39 provided with pin 40.

Lastly this portion of the plow beam 1 is provided with flanges 41 pierced by bolts 42 which also pierce a free plate 43 so that in combination with nuts 44 they form an adjusting clamp; at a suitable distance from said clamp and in alignment with it is located a second clamp formed by plates 45 and 46, bolts 47 and nuts 48, said second clamp being supported by supporting member 49 and reinforcements 25 attached to cover 23 and to the plow beam.

The stationary blade 5 is disposed at a convenient inclination with its lower end close to the spur or end of the plow share and attached to it by rivets.

In Figure 1 is shown the straw or cane leaf litter 50 being raised from the ground by stationary blade 5 till said litter reaches position 52 within range of rotary cutting blades 6.

After being cut, the litter of straw falls back to its original position, again forming a thick covering for the ground as shown at 53.

In Figure 3 a circular saw 51 is shown, in dotted lines, said saw may be employed in substitution of the cutting blades to which we have referred before.

Having described my invention, I claim as mine and desire that the Letters Patent issued cover the contents of the following claims:

1. In a cultivator plow, a plow beam, a plow share attached to said beam, a straight stationary cutter attached at an angle to said plow share adjacent thereof and to said plow beam at the plow throat, said stationary cutter being inclined upwardly and backwardly from said plow share, a shaft rotatably journalled on said plow beam in proximity to the throat thereof, a plurality of cutting blades constituting a rotary cutter secured to said shaft, said blades being dimensioned to extend approximately to the middle of said stationary cutter and remote from ground to be plowed, means for rotating said rotary cutter, said blades coacting with said stationary cutter in the upper portion thereof, said stationary cutter in the lower portion thereof constituting an inclined plane to raise litter from the ground and bring it to a point thereon where said blades of said rotary cutter, by coaction with said stationary cutter, will cut the litter.

2. In a cultivator plow as claimed in claim 1, said rotary and said stationary cutter being located on the side of said plow opposite to that to which the mold board of said plow turns the furrow slice.

3. In a cultivator plow as claimed in claim 1, and wherein said rotary cutter comprises a circular saw coacting with said stationary cutter, the lowermost portion of said circular saw extending approximately midway down the length of said stationary cutter.

GUILLERMO DIAZ ALVAREZ.

REFERENCES CITED

The following references are of record in the file of this patent:

UNITED STATES PATENTS

| Number | Name | Date |
|---|---|---|
| 254,334 | Kellogg | Feb. 28, 1882 |
| 337,174 | Love | Mar. 2, 1886 |
| 657,411 | Hamm | Sept. 4, 1900 |
| 1,216,193 | White | Feb. 13, 1917 |
| 2,364,449 | Jones | Dec. 5, 1944 |

FOREIGN PATENTS

| Number | Country | Date |
|---|---|---|
| 287,081 | Germany | Sept. 13, 1915 |